(12) United States Patent
McGovern

(10) Patent No.: US 7,950,085 B2
(45) Date of Patent: May 31, 2011

(54) ENHANCED SHOVEL SYSTEMS

(76) Inventor: Eddie J. McGovern, Phoenix, AZ (US)

( * ) Notice: Subject to any disclaimer, the term of this patent is extended or adjusted under 35 U.S.C. 154(b) by 162 days.

(21) Appl. No.: 12/353,024

(22) Filed: Jan. 13, 2009

(65) Prior Publication Data

US 2009/0183316 A1      Jul. 23, 2009

Related U.S. Application Data

(60) Provisional application No. 61/022,196, filed on Jan. 18, 2008.

(51) Int. Cl.
*A01B 1/02* (2006.01)
(52) U.S. Cl. .............................. 7/116; 294/57
(58) Field of Classification Search ........ 7/116; 294/51, 294/57–59
See application file for complete search history.

(56) References Cited

U.S. PATENT DOCUMENTS

| | | | |
|---|---|---|---|
| 576,756 A * | 2/1897 | Cole | 7/116 |
| 1,654,958 A * | 1/1928 | Breton | 403/100 |
| 4,023,221 A * | 5/1977 | Cadman | 7/114 |
| 4,114,216 A * | 9/1978 | Gatby | 7/116 |
| 4,198,090 A | 4/1980 | Gutman | |
| 4,402,529 A * | 9/1983 | Cavazza | 280/816 |
| 4,700,420 A | 10/1987 | Belanger | |
| D299,805 S | 2/1989 | Pifher | |
| 5,065,475 A | 11/1991 | Watt | |
| 5,103,520 A * | 4/1992 | Mazzo | 7/104 |
| 5,137,317 A | 8/1992 | Bieniek | |
| 5,799,996 A | 9/1998 | Fredrickson | |
| 5,975,602 A | 11/1999 | Zan | |
| 6,203,081 B1 | 3/2001 | Kegan | |
| 6,213,314 B1 | 4/2001 | Beemer | |
| 6,254,154 B1 | 7/2001 | Herzfeld et al. | |
| 6,283,522 B1 | 9/2001 | Renaud | |
| 6,485,076 B1 | 11/2002 | Chang | |
| 6,560,805 B2 * | 5/2003 | Dallas et al. | 7/116 |
| 6,948,208 B1 * | 9/2005 | Schlenner | 7/116 |
| 7,219,382 B2 * | 5/2007 | Johnson | 7/116 |
| 2007/0284123 A1 * | 12/2007 | Lee | 172/378 |

FOREIGN PATENT DOCUMENTS

WO      WO9117647 A1      11/1991

* cited by examiner

*Primary Examiner* — David B Thomas
(74) *Attorney, Agent, or Firm* — Schmeiser, Olsen & Watts LLP

(57) ABSTRACT

A system addressing the problem of storing and supporting outdoor items used while camping without transporting any additional equipment. The system provides a plurality of camp tools that are integral to a shovel, so as to provide the intended function without interfering with the normal usage of the shovel.

23 Claims, 9 Drawing Sheets

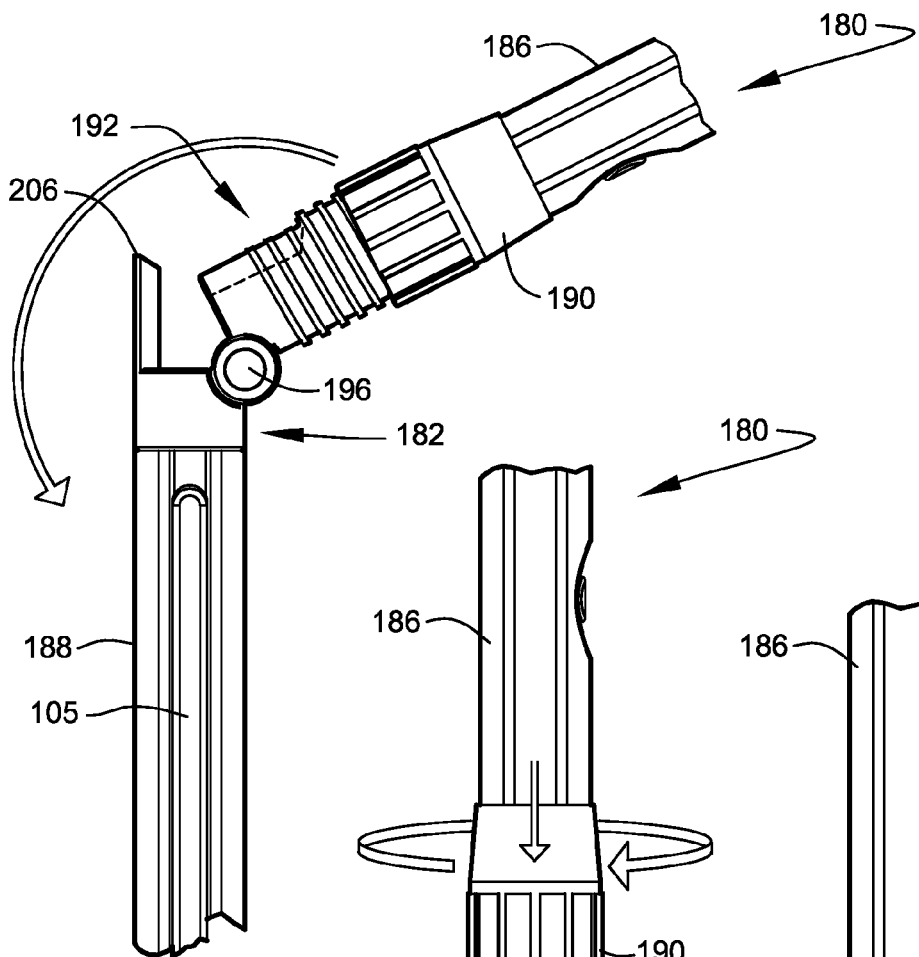
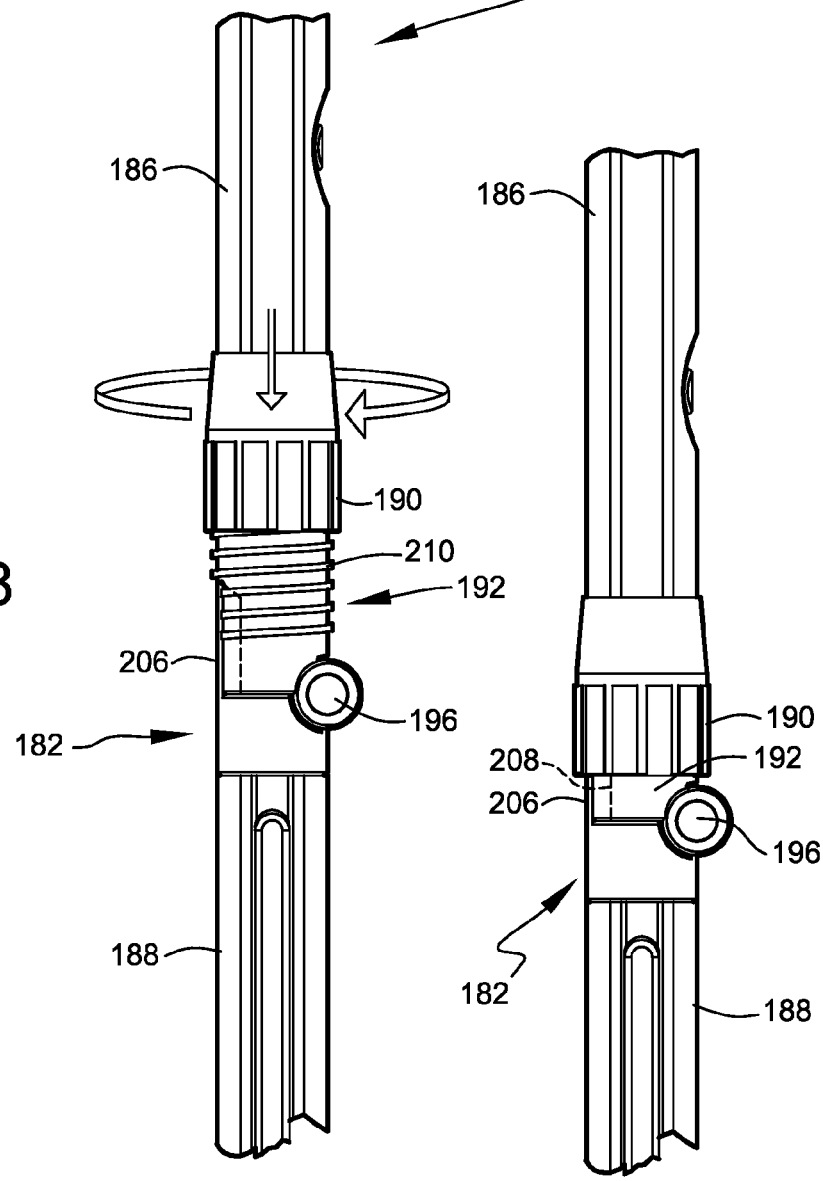
FIG. 8
FIG. 9
FIG. 10

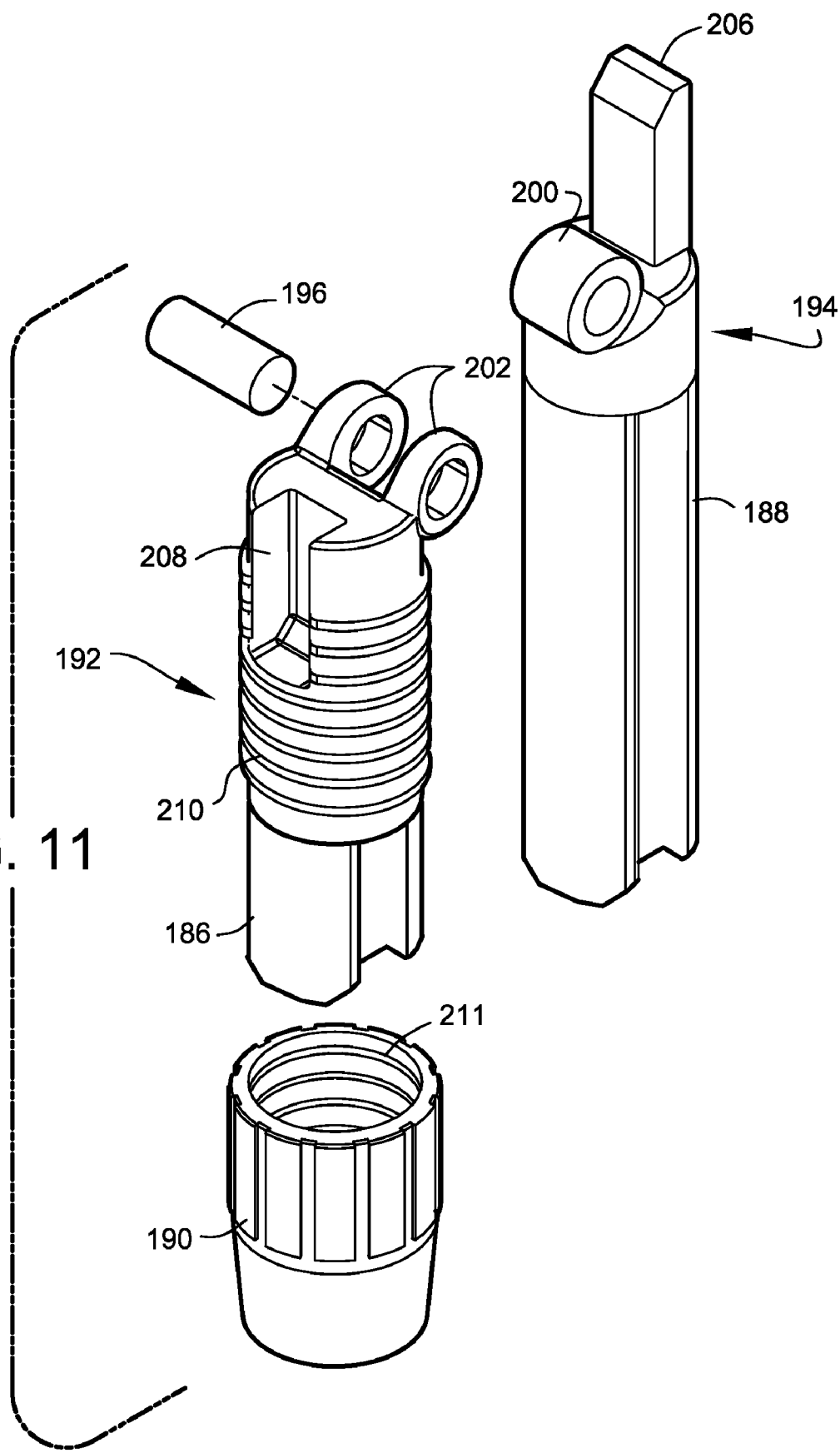

ENHANCED SHOVEL SYSTEMS

CROSS-REFERENCE TO RELATED APPLICATION

The present application is related to and claims priority from prior provisional application Ser. No. 61/022,196, filed Jan. 18, 2008, entitled "ENHANCED SHOVEL SYSTEMS", the content of which is incorporated herein by this reference and is not admitted to be prior art with respect to the present invention by the mention in this cross-reference section.

BACKGROUND

This invention relates to providing a system for improved storage and support of outdoor items used while camping. More particularly this invention relates to providing a system for improved storage and support of outdoor items used while camping, which preferably incorporates a shovel as the primary means of enclosure and support.

Individuals camping in the wilderness often utilize items that, by their nature or function, necessitate support or storage above the ground, such as, for example, lanterns, toilet paper, garbage bags, water jugs, etc. Typically, the person hangs such camping items on a tree, or some form of stand, so that the object is elevated by an amount above the ground for the object's intended use. This is not always possible when no tree or support is available for such a purpose. Often, the transport and erecting of such a temporary support may be inconvenient, representing an additional piece of equipment to be hauled to the campsite. In addition, many persons carry a shovel while camping for a multitude of purposes, including trenching around a tent, digging a latrine, moving rock from under a tent location, trenching for a fire, putting out a fire, etc. It would be of great benefit to campers to provide an enhanced shovel system that provides both support and digging functionality within a single tool.

OBJECTS AND FEATURES OF THE INVENTION

A primary object and feature of the present invention is to provide a system overcoming the problem of storing and supporting outdoor items used while camping without transporting any additional equipment.

It is a further object and feature of the present invention to provide such a system that is integral to a shovel, so as to provide the intended function without interfering with the normal usage of the shovel.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a system related to assisting at least one user during outdoor camping activities, such system comprising: at least one soil-shoveling tool structured and arranged to assist the at least one user to perform at least one shoveling activity; at least one handle-bar structured and arranged to assist the at least one user in manipulating such at least one soil-shoveling tool; and at least one non-shovel tool structured and arranged to provide at least one tool not related to such at least one shoveling activity; wherein such at least one shovel tool is supported by such at least one handle-bar; wherein such at least one non-shovel tool is supported by such at least one handle-bar; wherein such at least one handle-bar comprises at least one internal compartment structured and arranged to internally compartmentalize such at least one non-shovel tool therewithin; and wherein, when internally compartmentalized within such at least one handle-bar, such at least one non-shovel tool does not interfere with hand-manipulation of such at least one handle-bar.

Moreover, it provides such a system wherein: such at least one non-shovel tool comprises at least one support arm structured and arranged to support at least one camping item from such at least one handle-bar; such at least one support arm comprises at least one deployed position extending generally outwardly of such at least one handle-bar, and at least one stowed position located substantially within such at least one internal compartment of such at least one handle-bar. Additionally, it provides such a system wherein: such at least one support arm comprises at least one support-arm pivot structured and arranged to pivotally couple such at least one support arm with such at least one handle-bar; and such at least one support-arm pivot assists pivotal movement of such at least one support arm between such at least one deployed position and such at least one stowed position.

Also, it provides such a system wherein such at least one support arm comprises: at least one first positional maintainer structured and arranged to positionally maintain such at least one support arm in such at least one stowed position; at least one second positional maintainer structured and arranged to positionally maintain such at least one support arm in such at least one deployed position; and at least one deployment assister structured and arranged to assist an initial deployment of such at least one support arm from such at least one stowed position; wherein operational enablement and disablement of such at least one positional maintainer is user controllable. In addition, it provides such a system wherein such at least one deployment assister comprises at least one spring member. And, it provides such a system wherein: such at least one handle-bar comprises at least one first longitudinal axis extending substantially along its length; such at least one support arm comprises an elongated member having at least one second longitudinal axis extending along its length; and when in such at least one deployed position, such at least one second positional maintainer maintains such at least one first longitudinal axis in a generally perpendicular relationship relative to such at least one second longitudinal axis.

Also, it provides such a system wherein such at least one handle-bar comprises: at least one first handle portion structured and arranged to assist the at least one user in manipulating such at least one soil-shoveling tool; at least one second handle portion structured and arranged to supportively engage such at least one shovel tool; and at least one pivot joint structured and arranged to pivotally couple such at least one first handle portion and such at least one second handle portion; wherein an unfolded length of such at least one handle-bar is reduced by pivoting such at least one first handle to at least one folded position adjacent such at least one second handle portion. Moreover, it provides such a system wherein: such at least one pivot joint comprises at least one positional lock structured and arranged to positionally lock such at least one first handle portion and such at least one second handle portion in at least one substantially coaxial configuration; and such at least one positional lock is engagable and disengagable by the at least one user. Further, it provides such a system wherein such at least one soil-shoveling tool comprises: at least one shovel blade structured and arranged to assist manipulation of the soil; wherein such at least one shovel blade comprises at least one first end and at least one second end; wherein such at least one first end comprises at least one soil-penetrating shape structured and arranged to assist penetration of the soil; wherein such at least one second end comprises at least one handle-receiving socket structured and arranged to receive such at least one handle-bar.

Even further, it provides such a system wherein such at least one non-shovel tool comprises at least one storage container comprising at least one interior portion structured and arranged to contain storable camping items. Moreover, it provides such a system wherein such at least one storage container comprises: at least one deployed position extending generally outwardly of such at least one handle-bar, and at least one stowed position located substantially within such at least one internal compartment of such at least one handle-bar; wherein, when in such at least one deployed position, such at least one storage container comprises at least one storage opening structured and arranged to provide access to such at least one interior portion; and wherein, when in such at least one stowed position, such at least one interior portion is substantially enclosed within such at least one handle-bar. Additionally, it provides such a system wherein: such at least one storage container comprises at least one storage-container pivot structured and arranged to pivotally couple such at least one storage container with such at least one handle-bar; and such at least one storage-container pivot assists pivotal movement of such at least one storage container between such at least one deployed position and such at least one stowed position. Also, it provides such a system wherein such at least one storage container comprises at least one moisture-restrictive seal structured and arranged to limit the introduction of moisture to within such at least one interior portion.

In addition, it provides such a system wherein such at least one non-shovel tool comprises: at least one cutting blade structured and arranged to assist the at least one user to perform cutting actions; wherein such at least one cutting blade is locatable within such at least one handle-bar. And, it provides such a system wherein such at least one cutting blade comprises: at least one deployed position extending generally outwardly of such at least one handle-bar, and at least one stowed position located substantially within such at least one internal compartment of such at least one handle-bar. Further, it provides such a system wherein: such at least one cutting blade comprises at least one cutting-blade pivot structured and arranged to pivotally couple such at least one cutting blade with such at least one handle-bar; and such at least one cutting-blade pivot assists pivotal movement of such at least one cutting blade between such at least one deployed position and such at least one stowed position.

Even further, it provides such a system wherein such at least one non-shovel tool comprises at least one bottle opener structured and arranged to assist the user in removing bottle caps from beverage bottles. Furthermore, it provides such a system wherein: such at least one non-shovel tool comprises at least four support arms each one structured and arranged to support at least one camping item from such at least one handle-bar; wherein at least one of such at least four support arms comprises a length of about thirteen inches; and wherein at least one of such at least four support arms comprises a length of about seven inches.

Even further, it provides such a system wherein: such at least one soil-shoveling tool comprises at least one shovel blade structured and arranged to assist manipulation of the soil, wherein such at least one shovel blade comprises at least one first end and at least one second end, wherein such at least one first end comprises at least one soil-penetrating shape structured and arranged to assist penetration of the soil, and wherein such at least one second end comprises at least one handle-receiving socket structured and arranged to receive such at least one handle-bar; such at least one non-shovel tool comprises at least one storage container comprising at least one interior portion structured and arranged to contain storable camping items, at least one cutting blade structured and arranged to assist the at least one user to perform cutting actions, and at least one bottle opener structured and arranged to assist the user in removing bottle caps from beverage bottles.

In accordance with another preferred embodiment hereof, this invention provides a method of developing at least one multi-functional shovel to assist at least one user during outdoor camping activities, such method comprising the steps of: providing at least one shovel handle structured and arranged to assist the at least one user in manipulating at least one shovel blade during at least one shoveling activity; providing at least one camp tool, not related to such at least one shoveling activity, usable by the at least one user during such outdoor camping activities; and incorporating such at least one camp tool within such at least one shovel handle so that such at least one camp tool is permanently mounted to such at least one shovel handle; wherein such at least one shovel handle comprises at least one internal compartment structured and arranged to internally compartmentalize such at least one camp tool when not in use; and wherein, when internally compartmentalized within such at least one shovel handle, such at least one camp tool does not interfere with hand-manipulation of such at least one shovel handle. Even further, it provides such a method further comprising the steps of: providing at least one shovel blade structured and arranged to assist the at least one user to perform such at least one shoveling activity; and mounting such at least one shovel blade to such at least one shovel handle.

In accordance with another preferred embodiment hereof, this invention provides a system related to assisting at least one user during outdoor camping activities comprising: shovel tool means for assisting the at least one user to accomplish at least one shoveling activity; handle-bar means for assisting the at least one user manipulate such shovel tool means during the; and non-shovel tool means for providing at least one tool not relating to such at least one shoveling activity; wherein such shovel tool means is supported by such handle-bar means; wherein such non-shovel tool means is supported by such handle-bar means; wherein such handle-bar means comprises compartment means for substantially fully compartmentalizing such non-shovel tool means therewithin. In addition, it provides each and every novel feature, element, combination, step and/or method disclosed or suggested by this patent application.

BRIEF DESCRIPTION OF THE DRAWINGS

FIG. 8 shows a side view of the pivot joint in a partially folded configuration.

FIG. 9 shows a side view illustrating the manipulation of a threaded locking collar preferably used to fix the pivot joint in an unfolded position.

FIG. 10 shows a side view illustrating the pivot joint fixed in the unfolded position.

FIG. 11 shows an exploded view illustrating the preferred components of the pivot joint.

DETAILED DESCRIPTION OF THE BEST MODES AND PREFERRED EMBODIMENTS OF THE INVENTION

Figure 1A:
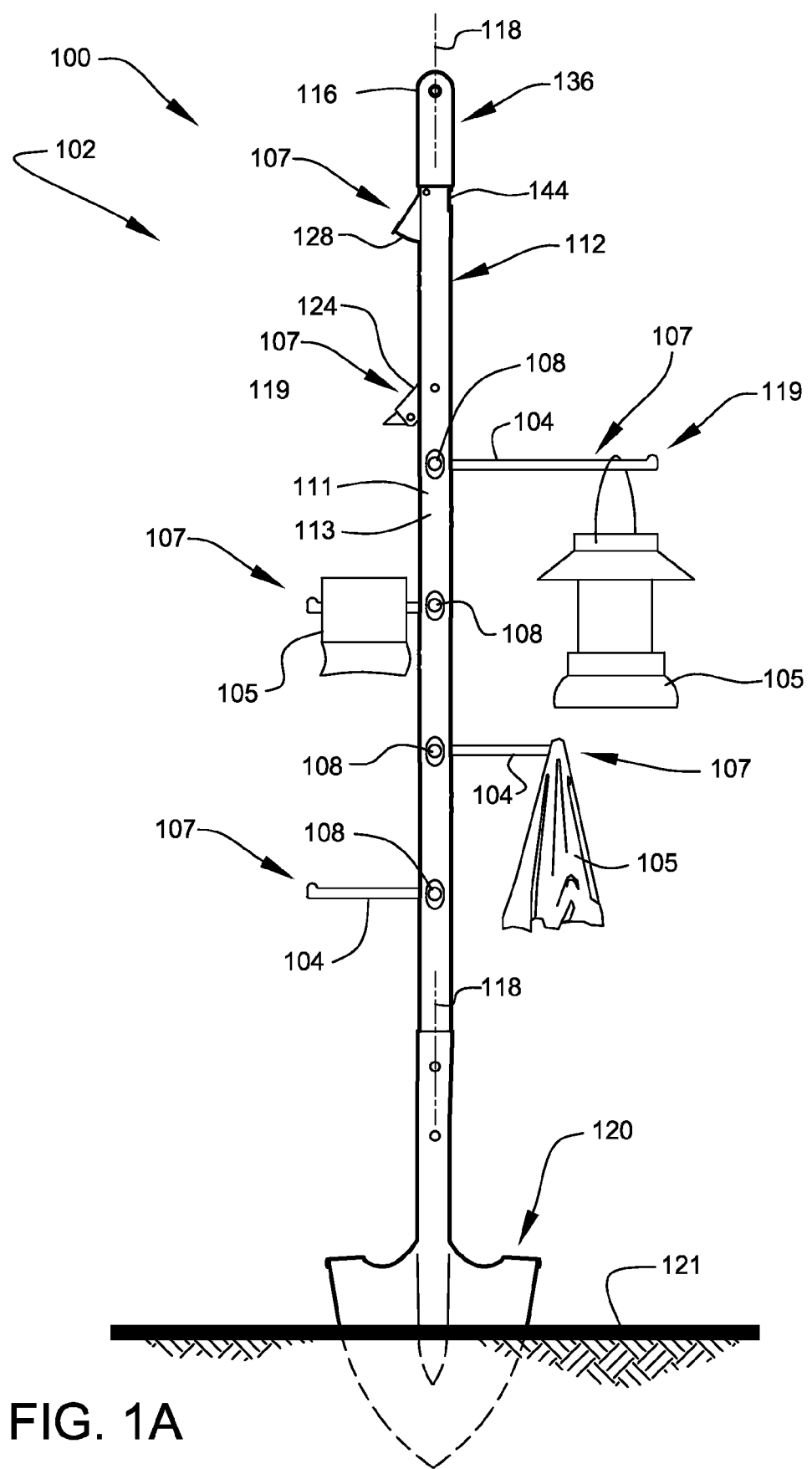
FIG. 1A shows a front elevation view, illustrating an enhanced shovel, comprising a preferred arrangement of camping tools deployed from a handle portion, according to a preferred embodiment of the present invention.
Figure 1B:
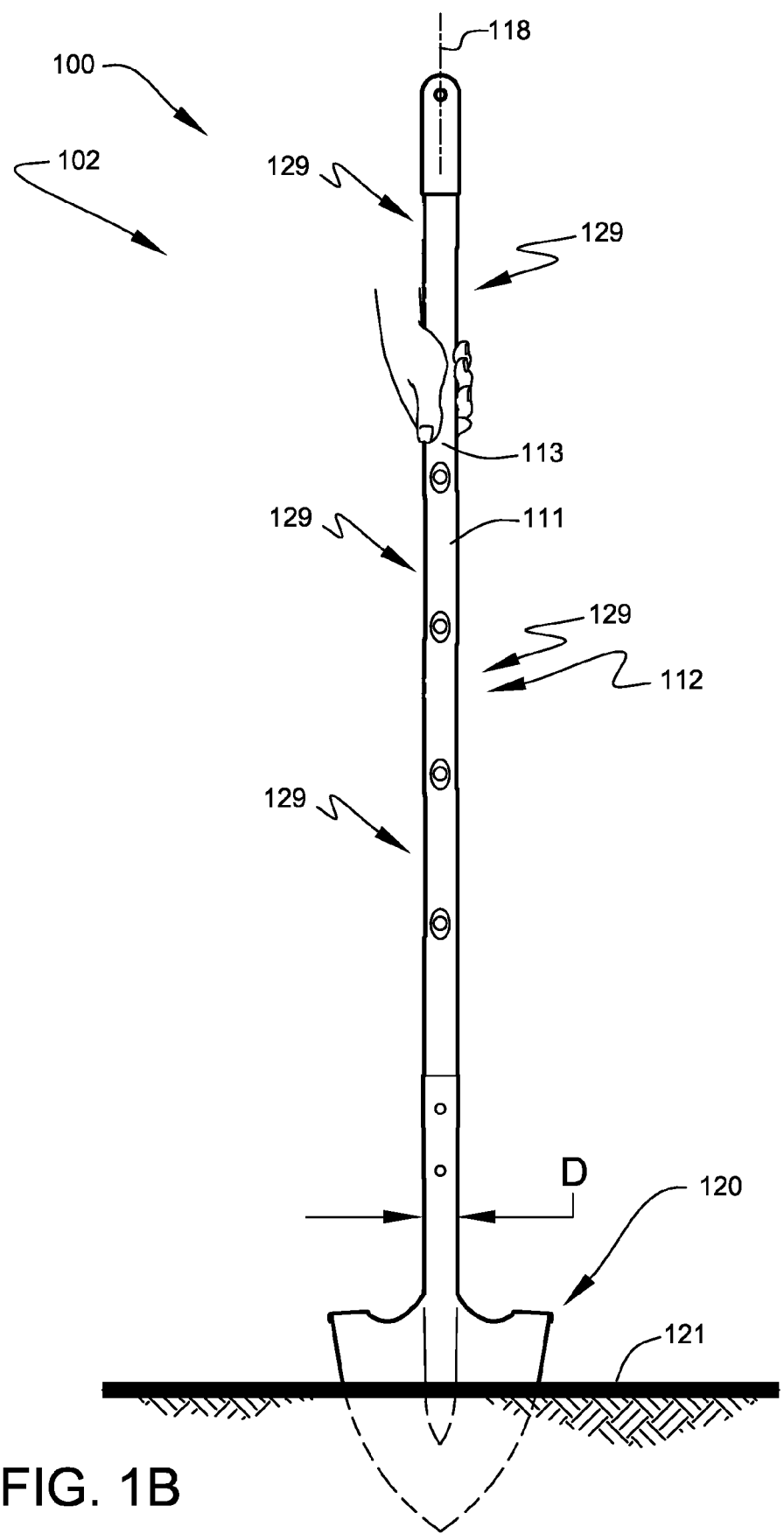
FIG. 1B shows a front elevation view, illustrating the enhanced shovel with the camping tools fully stowed within the handle portion, according to a preferred embodiment of FIG. 1.
Figure 2:
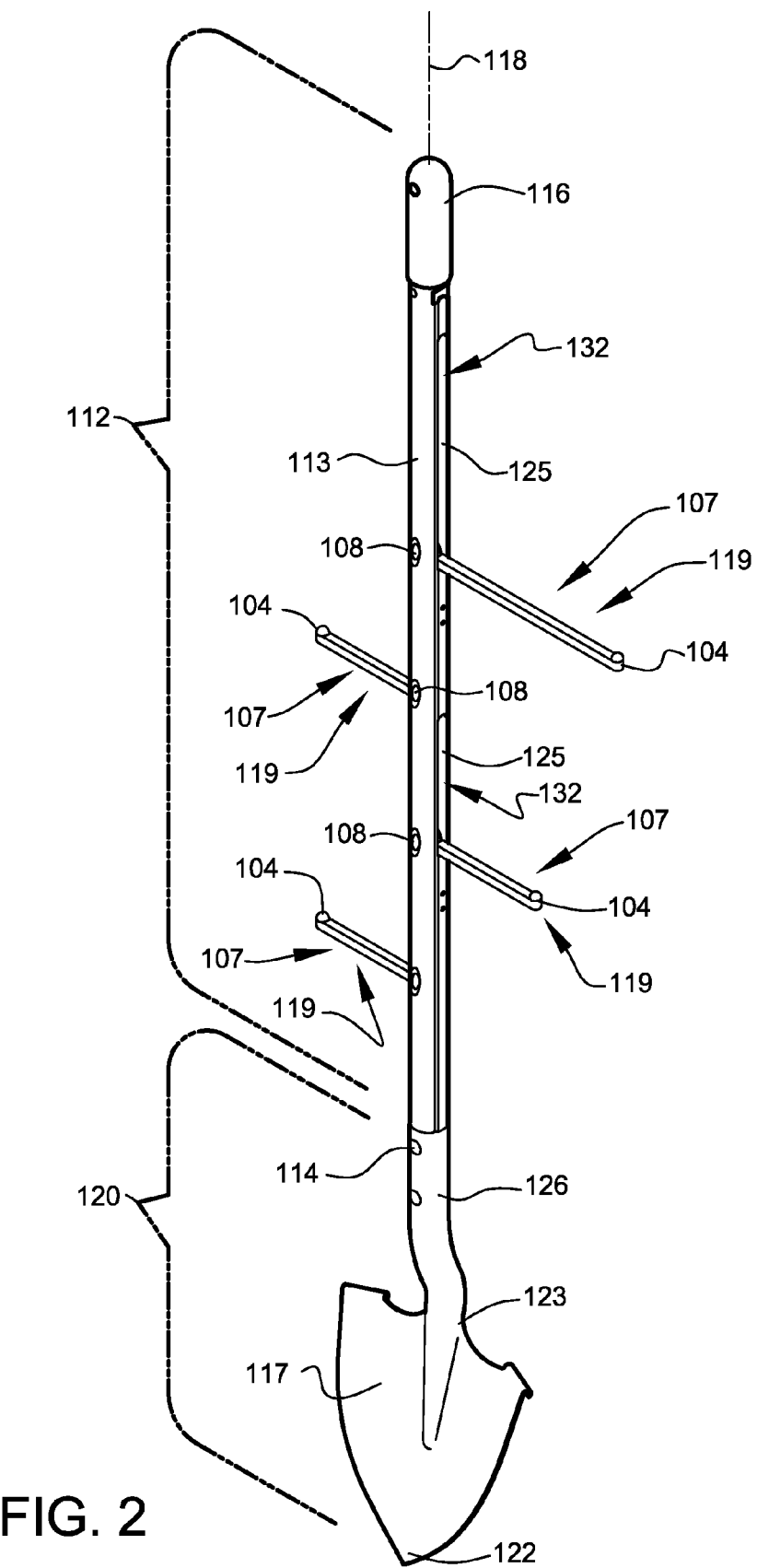
FIG. 2 shows a perspective view, illustrating the enhanced shovel, according to the preferred embodiment of FIG. 1A.

FIG. 1A shows a front elevation view, illustrating enhanced shovel 102 comprising a preferred arrangement of camp tools 107 deployed from handle portion 112, according to a preferred embodiment of the present invention. FIG. 1B shows a front elevation view, illustrating enhanced shovel 102 with camping tools 107 fully stowed within handle portion 112, according to a preferred embodiment of FIG. 1A. FIG. 2 shows a perspective view, illustrating enhanced shovel 102, according to the preferred embodiment of FIG. 1A.

Preferred embodiments of enhanced shovel system 100, preferably including enhanced shovel 102, are designed to be brought along by a user, while camping, to assist in the performance of digging and or shoveling activities. In addition, preferred embodiments of enhanced shovel system 100 provide a means for convenient storage and support of camping equipment 105, as shown. Such camping equipment 105 preferably comprises common camping items (e.g., lanterns, bathroom tissue, towels) used during outdoor camping activities, especially items that customarily require suspension from an elevated support during their use, as shown. Thus, enhanced shovel 102 provides both support and digging functions within a single hand-operated tool. Preferably, enhanced shovel 102 comprises an assembly of two principle components, preferably comprising handle portion 112 and shovel-blade portion 120, as shown.

Shovel-blade portion 120 is preferably arranged in such manner as to permit its use in the manipulation of soil (e.g. soiled penetration, soil lifting, etc.). Shovel-blade portion 120 preferably comprises a substantially solid plate 117 having a lower and an upper end respectively identified herein as first end 122 and second end 123, as shown. Preferably, first end 122 comprises at least one soil-penetrating shape, most preferably a V-shaped point, as shown. This preferred shape assists in the penetration of shovel-blade portion 120 into soil 110, as shown in FIG. 1A and FIG. 1B. Preferably, second end 123 comprises handle-receiving socket 126 structured and arranged to receive an end of handle portion 112, as shown. Preferably, plate 117 and handle-receiving socket 126 are formed from a single material, most preferably, a single piece of sheet metal. Preferably, the sheet metal of plate 117 is formed into a slightly concaved shape, as shown, to stiffen the plate and assists in retaining soil during lifting. This type of construction is often referred to in the art as an "open-back" shovel blade. Alternately preferably, shovel-blade portion 120 is constructed from a rigid molded plastic, or the like.

Preferably, handle portion 112 is tightly fitted to handle-receiving socket 126 and is preferably retained therein by means of an appropriate mechanical fastener 114 (e.g., a preferred rivet, a preferred bolt, or a preferred screw). Upon reading the teachings of this specification, those of ordinary skill in the art will now understand that, under appropriate circumstances, considering such issues as intended use, etc., other shovel-tool arrangements, such as integrally forming a shovel blade with a handle, utilizing a square-point shovel blade, providing perforations within the blade plate to assist sifting of material, omitting the shovel blade in favor of a spike (to develop a multifunctional walking stick), allowing for interchangeable blades, etc., may suffice.

Together, handle portion 112 (at least embodying herein at least one handle-bar structured and arranged to assist the at least one user in manipulating such at least one soil-shoveling tool) and shovel-blade portion 120 (at least embodying herein at least one soil-shoveling tool) enables the above-described "shovel" functionality wherein a user may use enhanced shovel 102 to perform at least one shoveling activity.

Preferably, as best illustrated in FIG. 1A, handle portion 112 is designed to contain at least one, preferably a plurality of deployable camp tools 107, as shown. Preferably, each camp tool 107 is useful in assisting a user to perform an outdoor camping activity. It is noted that such camp tools 107 are, by preference, not directly related to shoveling activities (wherein such camp tools at least embody herein non-shovel tools). Preferred camp tools 107 at least comprise one or more retractable support arms 104, as shown. A preferred combination of camp tools 107 comprises one or more retractable support arms 104 in combination with retractable knife 124, storage container 128, and bottle opener 144, as shown.

Preferably, handle portion 112 comprises an elongated cylindrical bar comprising outer wall 111 having, along the majority of its length, an outer graspable surface 113, as shown. Preferably, outer graspable surface 113 comprises a substantially uniform outer diameter D of between about 1½ inches and about 2 inches, as shown. Preferably, outer wall 111 is positioned substantially symmetrically about first longitudinal axis 118, which preferably extends substantially along the length of the handle, as shown. Upon reading the teachings of this specification, those of ordinary skill in the art will now understand that, under appropriate circumstances, considering such issues as ease of use, etc., other handle arrangements, such as curved handle shapes, handles having offset portions, folding handles, etc., may suffice.

Preferably, handle portion 112 comprises one or more internal compartments 125 structured and arranged to internally compartmentalize camp tools 107, as will be discussed with respect to FIG. 4 and FIG. 5. Preferably, each of the deployable camp tools 107 comprises internally stowed position 129 substantially within internal compartment 125 of handle portion 112. When in such a stowed position, camp tools 107 are maintained at a position essentially equal to or below the level of outer graspable surface 113 so as to not interfere with hand-manipulation of handle portion 112 by the user, as best illustrated in FIG. 1B.

Preferably, the upper distal end 136 of handle portion 112 preferably comprises handle-gripping portion 116, as shown. Handle-gripping portion 116 preferably comprises an elastomeric material that assists in user-manipulation of enhanced shovel 102 (e.g., prevents slipping in the hands of a user, protects the user from unwanted vibration, etc.).

A preferred embodiment of handle portion 112 preferably comprises at least one retractable support arm 104, more preferably, four retractable support arms 104, as shown. Preferably, each retractable support arm 104 is designed to assist in the support of camping equipment 105 from handle portion 112 at a level preferably above ground surface 121, as shown (at least embodying herein wherein such at least one non-shovel tool comprises at least one support arm structured and arranged to support at least one camping item from such at least one handle-bar). Preferably, each retractable support arm 104 comprises a deployed position 119 that extends generally outwardly of handle portion 112 (as best illustrated in FIG. 1A) and the previously noted stowed position 129 that locates retractable support arm 104 substantially within its respective internal compartment 125 of handle portion 112.

Figure 3:
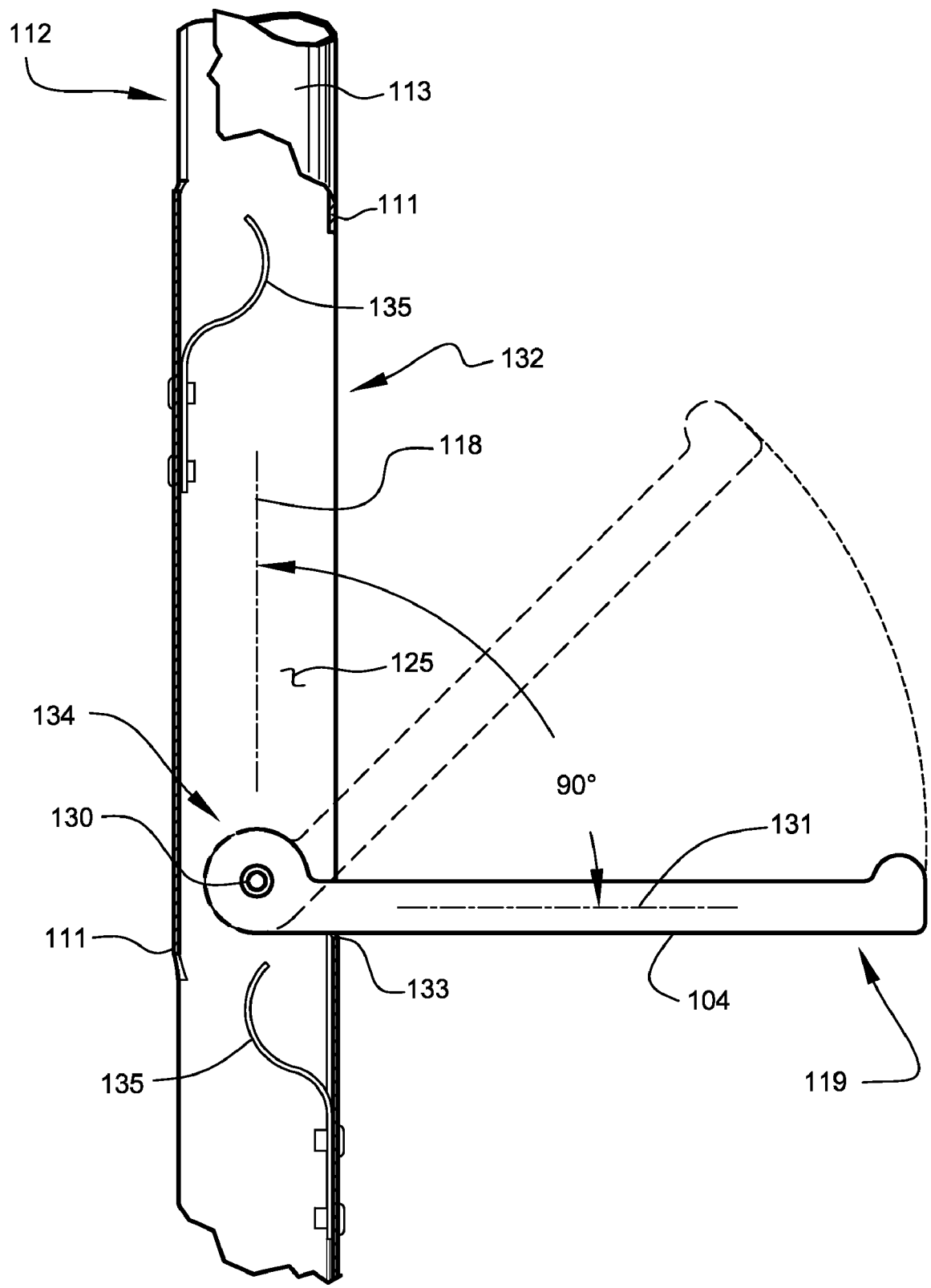
FIG. 3 shows an enlarged cutaway view, illustrating preferred internal arrangements of the enhanced shovel, according to the preferred embodiment of FIG. 1A.

FIG. 3 shows an enlarged cutaway view, illustrating preferred internal arrangements of enhanced shovel 102, according to the preferred embodiment of FIG. 1A. Preferably, each retractable support arm 104 is pivotally coupled to handle portion 112 by support-arm pivot 130, as shown. Preferably, support-arm pivot 130 assists pivotal movement of retractable support arm 104 between deployed position 119 and stowed position 129, as suggested by the dashed-line depiction of the illustration.

Preferably, each retractable support arm 104 comprises a generally elongated member having a second longitudinal axis 131 extending substantially along its length, as shown. Preferably, each retractable support arm 104 passes in and out of a respective internal compartment 125 through opening 132 in outer wall 111, as shown. The lower terminating edge 133 of opening 132 is preferably positioned to form a stop adapted to maintain retractable support arm 104 in a preferred deployed orientation relative to handle portion 112. More specifically, the lower terminating edge 133 of opening 132 preferably functions as a positional maintainer (at least embodying herein at least one second positional maintainer) to maintain second longitudinal axis 131 of retractable support arms 104 in a generally perpendicular relationship relative to first longitudinal axis 118 of handle portion 112, as shown. Upon reading the teachings of this specification, those of ordinary skill in the art will now understand that, under appropriate circumstances, considering such issues as intended use, cost, etc., other position-maintaining arrangements, such as supportive ratcheting holders, supportive cords, fixing pins, etc., may suffice.

Preferably, retractable support arm 104 is maintained in stowed position 129 by a user-releasable lock assembly 134 (at least embodying herein at least one first positional maintainer). Preferably, user-releasable lock assembly 134 comprises a releasable locking mechanism, such as a locking ratchet mechanism, or the like. Preferably, user-releasable lock assembly 134 is operated by depressing push button 108 located at a user-accessible position on handle portion 112, as shown. In addition, retractable support arm 104 comprises at least one deployment assister, most preferably spring member 135, as shown. Spring member 135 preferably assists the initial deployment of retractable support arm 104 from stowed position 129 by "spring" action. Preferably, spring member 135 is compressed as retractable support arm 104 is swung upwardly into a respective internal compartment 125. On release of user-releasable lock assembly 134, spring member 135 preferably "ejects" retractable support arm 104 from internal compartment 125 as the compressive energy stored by spring member 135 is released. Spring member 135 preferably comprises a small "S"-shaped segment of spring steel mechanically fastened to the internal surface of outer wall 111 (within internal compartment 125), as shown.

It is preferred that at least one retractable support arm 104 be substantially longer in relation to the other retractable support arms 104, as shown. This preference increases the functionality of enhanced shovel 102 by accommodating the support of a wider range of camping equipment 105 than would be possible using arms of shorter length. Preferably, at least one of the four retractable support arms 104 comprises a projecting length of about thirteen inches with the remaining retractable support arm 104 comprising projecting lengths of about seven inches, as best shown in FIG. 1A.

Handle portion 112 preferably supports and allows for the use and storage of retractable knife 124, as shown. Retractable knife 124 (at least embodying herein at least one cutting blade structured and arranged to assist the at least one user to perform cutting actions) is preferably stored within an internal compartment of handle portion 112 and can be rotationally extended outward to allow for use as a cutting tool. Preferably, retractable knife 124 can be used to cut items frequently used while camping (e.g., rope, twine, lanyard, etc.).

Preferably, retractable knife 124 comprises a deployed position 119 that extends generally outwardly of handle portion 112 (as best illustrated in FIG. 1A) and a stowed position 129 that locates retractable knife 124 substantially within its respective internal compartment 125 of handle portion 112. The preferred arrangements of retractable knife 124 within handle portion 112 preferably follow the above-described preferred structures and arrangements of retractable support arms 104. Thus, retractable knife 124 preferably comprises component arrangements analogous to support-arm pivot 130, user-releasable lock assembly 134, and spring member 135 of retractable support arm 104.

Figure 4:
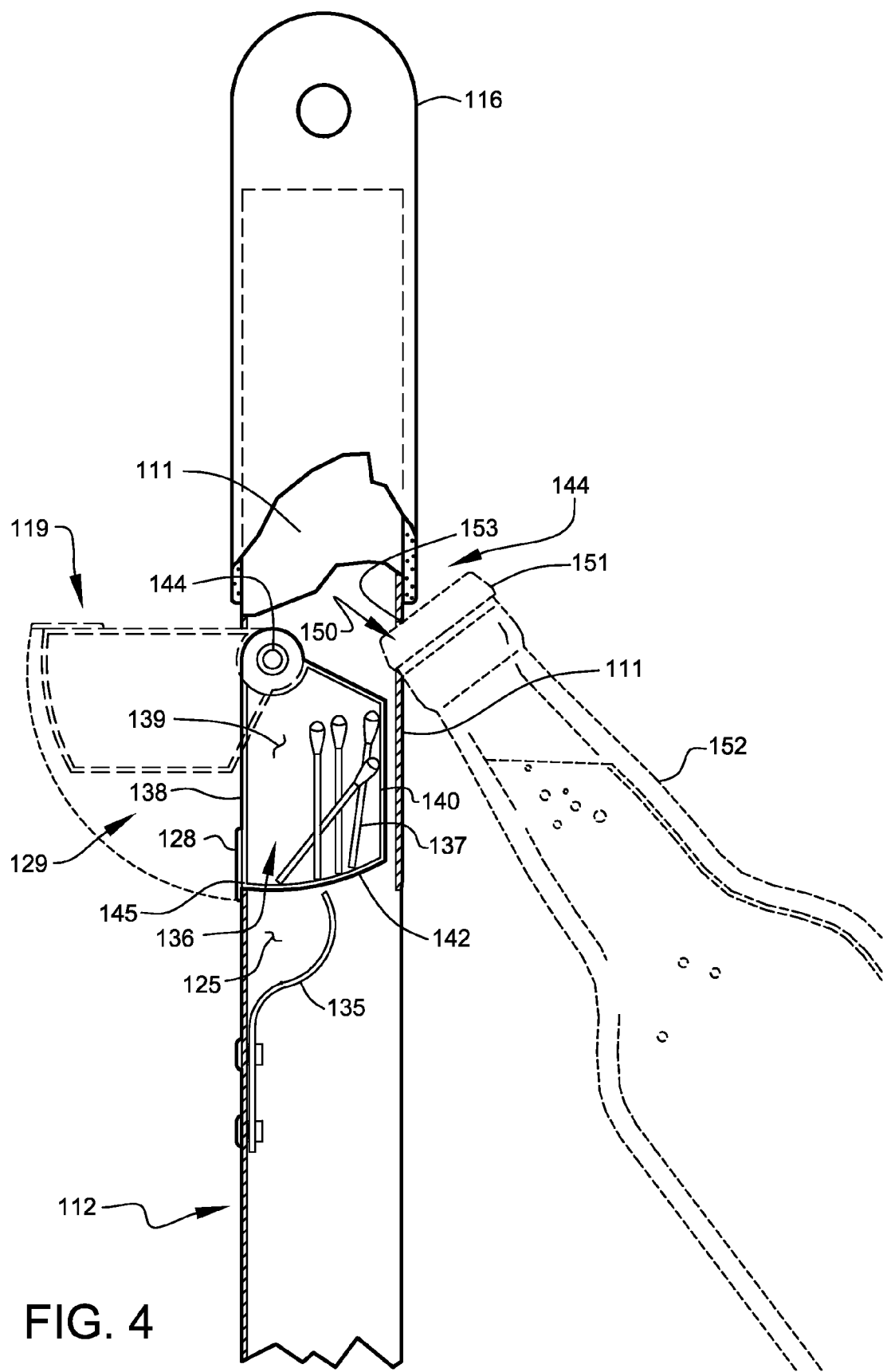
FIG. 4 shows another enlarged cutaway view, illustrating additional preferred internal arrangements of the enhanced shovel, according to the preferred embodiment of FIG. 1A.

FIG. 4 shows another enlarged cutaway view, illustrating additional preferred internal features and arrangements of enhanced shovel 102, according to the preferred embodiment of FIG. 1A. Preferably, enhanced shovel 102 further comprises at least one deployable storage container 128, as shown. Preferably, storage container 128 comprises at least one interior portion 136 preferably adapted to contain small storable camping items 137, as shown. Storage container 128 is preferably designed to deploy by pivoting outwardly from compartment 125 of handle portion 112.

As with prior camp tools 107, storage container 128 preferably comprises a deployed position 119 and a stowed position 129, as shown. Storage container 128 preferably comprises a box-like structure preferably formed by front wall 138, rear wall 140, upper wall 141, an actuate bottom wall 142, and opening 139, as shown. Preferably, opening 139 provides access to interior portion 136 when storage container 128 is in deployed position 119, as shown. When in stowed position 129, storage container 128 is substantially enclosed within internal compartment 125, thus preferably preventing small storable camping items 137 from passing out of interior portion 136. Preferably, storage container 128 is pivotally coupled to handle portion 112 by storage-container pivot 144, as shown. Preferably, storage-container pivot 144 assists pivotal movement of storage container 128 between stowed position 129 and deployed position 119, as illustrated by the dashed-line depiction. Preferably, storage container 128 comprises at least one moisture-resisting seal 145 designed to limit the introduction of moisture into interior portion 136.

Enhanced shovel 102 preferably comprises bottle opener 147, as shown. Bottle opener 147 is preferably generated by forming a transverse slot opening 150 within outer wall 111, as shown. Preferably, transverse slot opening 150 is formed approximately perpendicular to first longitudinal axis 118 and is designed to engage bottle cap 151, as shown. Preferably, the lower edge of transverse slot opening 150 comprises a projecting blade-like engager 152 adapted to engage the peripheral flange of bottle cap 151, as shown. Preferably, the upper edge of transverse slot opening 150 comprises fulcrum surface 153 adapted to engage the top of bottle cap 151, as shown. Preferably, bottle cap 151 is removed by rotation of bottle 152 while bottle cap 151 is engaged on arcuately-shaped engager 152 and fulcrum surface 153.

Figure 5:
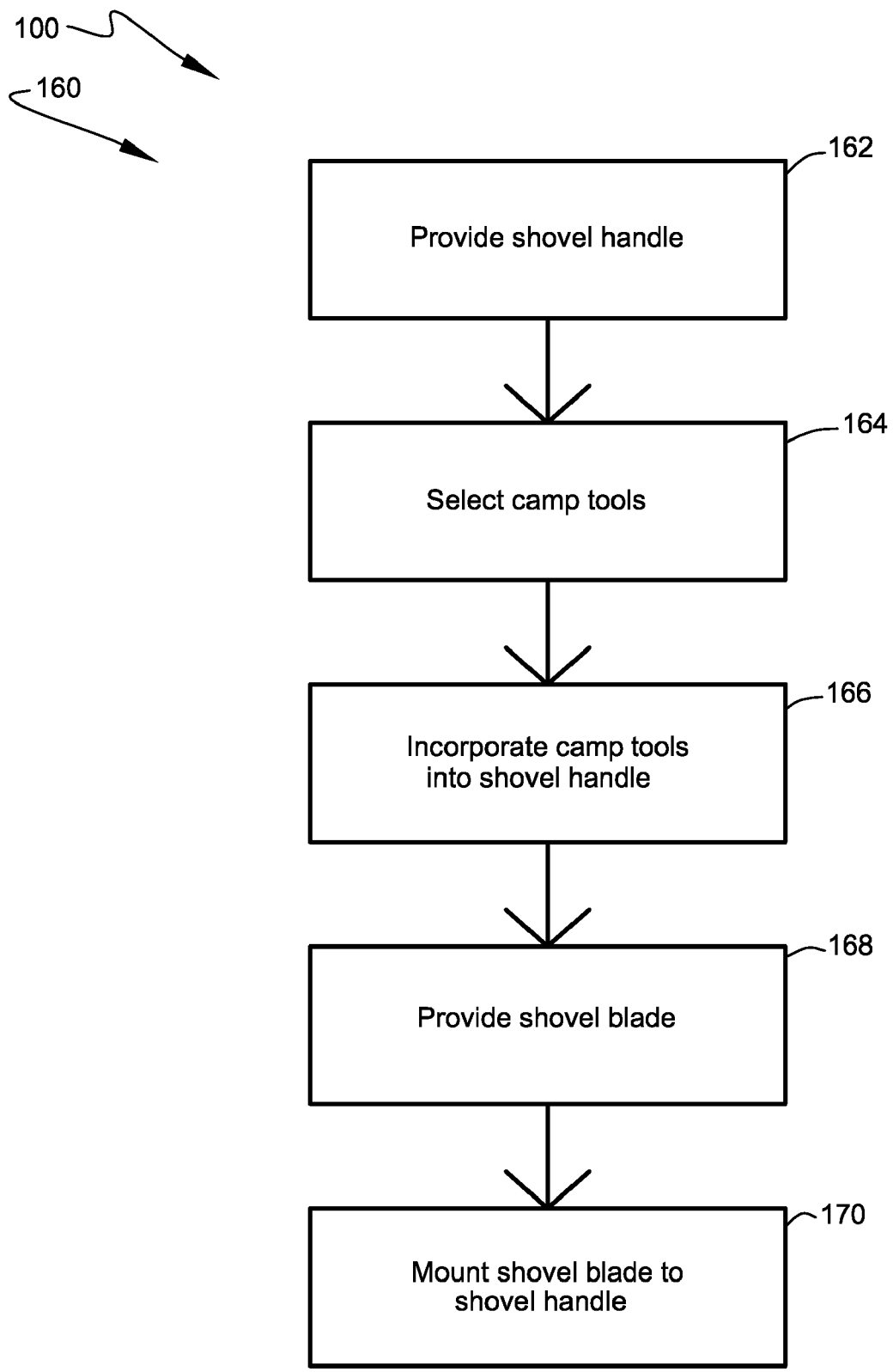
FIG. 5 shows a schematic diagram generally illustrating a method of developing at least one multi-functional shovel to assist at least one user during outdoor camping activities, according to a preferred method of the present invention.

FIG. 5 shows a schematic diagram generally illustrating a preferred method 160 used to develop at least one multi-functional shovel to assist at least one user during outdoor camping activities, according to a preferred method of enhanced shovel system 100. Method 160 is preferably embodied within a series of preferred steps described below.

Initially, at least one shovel handle, generally matching the structures and arrangements of handle portion 112, is provided as indicated in preferred step 162. Next, as indicated in preferred step 164, one or more camp tools are selected for incorporation into handle portion 112. Next, the selected camp tools are incorporated within the shovel handle so that the camp tools are permanently mounted to the handle as indicated in preferred step 166. It is again noted that the selected tools are integrated within the handle so as to maintain the user's ability to grip and manipulate handle portion 112 in a customary manner. Next, as indicated in preferred step 168, at least one shovel blade, generally matching the structures and arrangements of shovel-blade portion 120, is provided. Finally, the above-noted shovel blade is mounted to the shovel handle, as indicated in preferred step 170.

Figure 6:
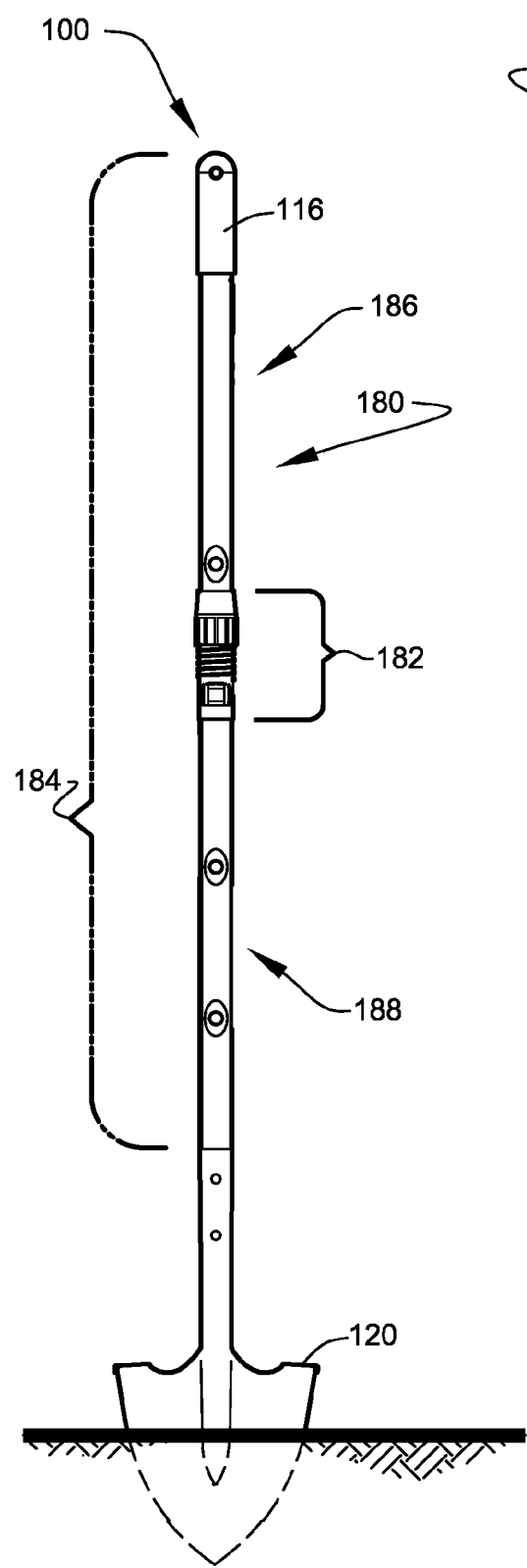
FIG. 6 shows a front elevation view, illustrating an alternate enhanced shovel, comprising a pivot joint, according to another preferred embodiment of the present invention.
Figure 7:
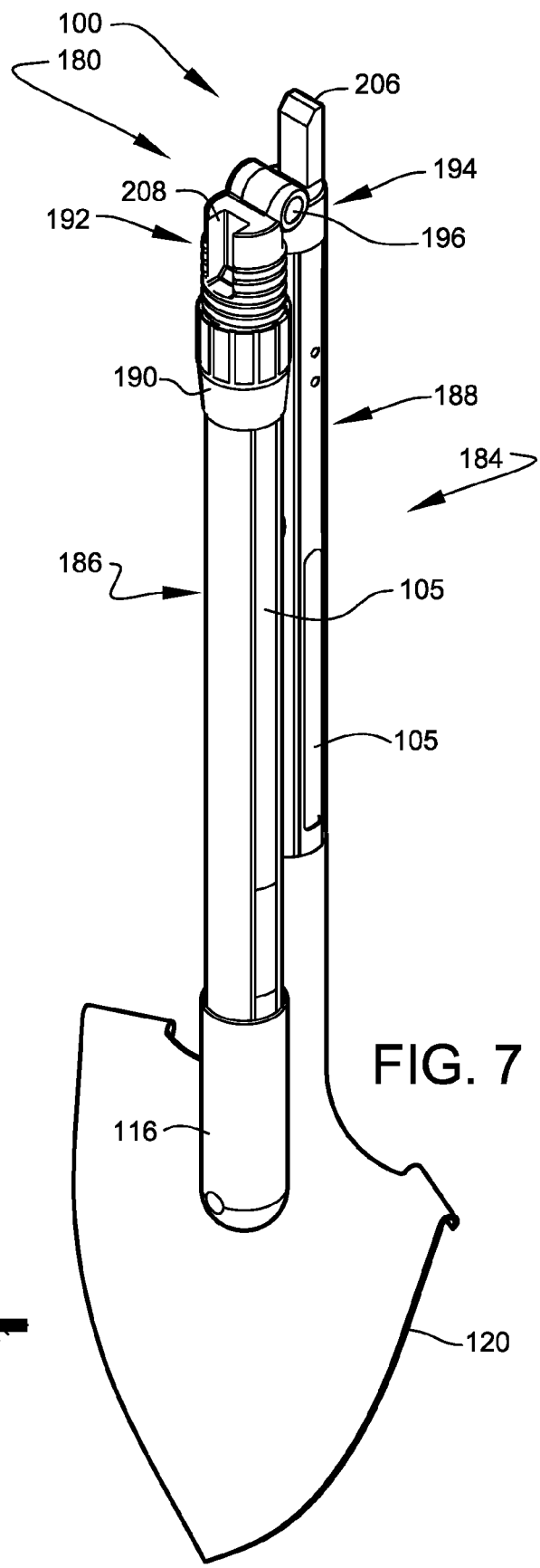
FIG. 7 shows a perspective view of the alternate enhanced shovel of FIG. 6 in a folded configuration.

FIG. 6 shows a front elevation view, illustrating alternate enhanced shovel 180, comprising pivot joint 182, according to another preferred embodiment of the present invention. FIG. 7 shows a perspective view of alternate enhanced shovel 180 of FIG. 6 in a folded configuration. Alternate enhanced shovel 180 preferably comprises a folding embodiment of enhanced shovel system 100. In this preferred embodiment of the present invention, handle portion 184 of alternate enhanced shovel 180 is preferably divided into two independent segments joined by pivot joint 182, as shown.

Handle portion 184 preferably comprises upper handle portion 186 and lower handle portion 188, as shown. Lower handle portion 188 is preferably coupled with shovel-blade portion 120, as shown (at least embodying herein at least one second handle portion structured and arranged to supportively engage such at least one shovel tool). Both upper handle portion 186 (at least embodying herein at least one first handle portion structured and arranged to assist the at least one user in manipulating such at least one soil-shoveling tool) and lower handle portion 188 are preferably configured to contain deployable camping equipment 105 in a manner substantially similar to the preferred arrangements of handle portion 112.

Pivot joint 182 preferably enables pivotal rotation of upper handle portion 186 and lower handle portion 188 between the extended position of FIG. 6, and the folded position of FIG. 7. When configured to the folded position of FIG. 7, upper handle portion 186 and lower handle portion 188 are folded together in a substantially parallel relationship to reduce the overall length of handle portion 184 to facilitate storage of alternate enhanced shovel 180 (at least embodying herein wherein an unfolded length of such at least one handle-bar is reduced by pivoting such at least one first handle to at least one folded position adjacent such at least one second handle portion).

FIG. 8 through FIG. 10 illustrate a preferred manipulation of pivot joint 182 to fix pivot joint 182 in an unfolded position. FIG. 8 shows a side view of pivot joint 182 in a partially folded configuration. FIG. 9 shows a side view illustrating the manipulation of threaded locking collar 190 preferably used to secure pivot joint 182 in the unfolded position. FIG. 10 shows a side view illustrating pivot joint fixed in the unfolded position with upper handle portion 186 and lower handle portion 188 secured in a coaxial configuration. FIG. 11 shows an exploded view illustrating the preferred components of pivot joint 182.

Pivot joint 182 preferably comprises a set of inter-engaging parts identified herein as upper pivot member 192, lower pivot member 194, coupler pin 196, and threaded locking collar 190, as shown. Upper pivot member 192 is firmly joined with upper handle portion 186 and lower pivot member 194 is firmly joined with lower handle portion 188, as shown. Pivot joint 182 preferably comprises at least one cylindrical upper knuckle 200 integrally formed with upper pivot member 192, and at least one, preferably two, cylindrical lower knuckles 202 integrally formed with lower pivot member 194, as shown. Preferably, upper knuckle 200 is interdigitally positioned between the two lower knuckles 202, and the retaining coupler pin 196 is pressed through the internal apertures of the lower knuckles 202 and upper knuckle 200, thereby pivotally joining the two pivot members, as shown. It will be understood by those skilled in the art, based on the teachings of this disclosure that under appropriate circumstances, considering such issues as cost and intended use, other hinge structures, such as, pivot joints formed separately from the upper and lower pivot members, double jointed connections, etc., may suffice.

Lower pivot member 194 preferably comprises an upwardly projecting bar 206 structured and arranged to engage a complementary receiving slot 208 formed within upper pivot member 192. Thus, projecting bar 206 is preferably structured and arranged to reside within receiving slot 208 when pivot joint 182 is placed in the unfolded position of FIG. 6.

Upper pivot member 192 further comprises a substantially cylindrical body having an outer surface supporting a set of integrally formed helical threads 210, as shown. Threaded locking collar 190 preferably comprises a hollow cylindrical member fitted with inner helical-threading 211 adapted to threadably engage helical threads 210. Manual rotation of threaded locking collar 190 results in the up-and-down translation of threaded locking collar 190 over upper pivot member 192. Both projecting bar 206 and receiving slot 208 are preferably sized and arranged so as to not impede the translational movement of threaded locking collar 190 over upper pivot member 192.

In preferred use, pivot joint 182 is locked in the unfolded position by a clockwise rotation of threaded locking collar 190 down upper pivot member 192, as diagrammatically illustrated in FIG. 9. This action places threaded locking collar 190 in a lowered position blocking the pivoting movement of projecting bar 206 out of receiving slot 208. This preferably prevents relative rotation of upper pivot member 192 and lower pivot member 194 about pivot axis 216 of coupler pin 196. Thus, threaded locking collar 190 comprises at least one positional lock structured and arranged to positionally lock such at least one first handle portion and such at least one second handle portion in at least one substantially coaxial configuration, as shown. Release of pivot joint 182 is preferably achieved by rotating threaded locking collar 190, in a counterclockwise direction, to a position above both projecting bar 206 and receiving slot 208. In this configuration, pivot joint 182 is again free to hinge about pivot axis 216. Such positional locking arrangement is preferably engagable and disengagable by the user.

Pivot joint 182 is preferably constructed from a substantially rigid and durable material, preferably cast metal, most preferably cast aluminum selected for favorable weight, durability, and economy. All handle portions are preferably constructed from substantially rigid and durable materials, preferably extruded aluminum. Upon reading this specification, those with ordinary skill in the art will now appreciate that, under appropriate circumstances, considering such issues as cost, user preference, etc., other material arrangements such as, for example, the use of rigid plastics, composite materials including fiberglass-reinforced resins, etc., may suffice.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system related to assisting at least one user during outdoor camping activities, said system comprising:
   a) at least one soil-shoveling tool structured and arranged to assist the at least one user to perform at least one shoveling activity;
   b) at least one handle-bar structured and arranged to assist the at least one user in manipulating said at least one soil-shoveling tool; and
   c) at least one support arm structured and arranged to provide support for at least one tool not related to such at least one shoveling activity, said support arm having a flange extending away from said support arm;
   d) wherein said at least one shovel tool is supported by said at least one handle-bar;
   e) wherein said at least one support arm is supported by said at least one handle-bar;
   f) wherein said at least one handle-bar comprises at least one internal compartment structured and arranged to internally compartmentalize said at least one non-shovel tool therewithin; and
   g) wherein, when internally compartmentalized within said at least one handle-bar, said at least one support arm does not interfere with hand-manipulation of said at least one handle-bar.

2. The system according to claim 1 wherein said at least one handle-bar comprises:
   a) at least one first handle portion structured and arranged to assist the at least one user in manipulating said at least one soil-shoveling tool;
   b) at least one second handle portion structured and arranged to supportively engage said at least one shovel tool; and
   c) at least one pivot joint structured and arranged to pivotally couple said at least one first handle portion and said at least one second handle portion;
   d) wherein an unfolded length of said at least one handle-bar is reduced by pivoting said at least one first handle to at least one folded position adjacent said at least one second handle portion.

3. The system according to claim 2 wherein:
   a) said at least one pivot joint comprises at least one positional lock structured and arranged to positionally lock said at least one first handle portion and said at least one second handle portion in at least one substantially coaxial configuration; and
   b) said at least one positional lock is engagable and disengagable by the at least one user.

4. The system according to claim 1 wherein:
   a) said at least one tool not related to such at least one shoveling activity comprises a camping item;
   b) said at least one support arm comprises
      i) at least one deployed position extending generally outwardly of said at least one handlebar, and
      ii) at least one stowed position located substantially within said at least one internal compartment of said at least one handle-bar.

5. The system according to claim 4 wherein:
   a) said at least one support arm comprises at least one support-arm pivot structured and arranged to pivotally couple said at least one support arm with said at least one handle-bar; and
   b) said at least one support-arm pivot assists pivotal movement of said at least one support arm between such at least one deployed position and such at least one stowed position.

6. The system according to claim 5 wherein said at least one support arm comprises:
   a) at least one first positional maintainer structured and arranged to positionally maintain said at least one support arm in such at least one stowed position;
   b) at least one second positional maintainer structured and arranged to positionally maintain said at least one support arm in such at least one deployed position; and
   c) at least one deployment assister structured and arranged to assist an initial deployment of said at least one support arm from such at least one stowed position;
   d) wherein operational enablement and disablement of said at least one first positional maintainer is user controllable.

7. The system according to claim 6 wherein said at least one deployment assister comprises at least one spring member.

8. The system according to claim 7 wherein:
   a) said at least one handle-bar comprises at least one first longitudinal axis extending substantially along its length;
   b) said at least one support arm comprises an elongated member having at least one second longitudinal axis extending along its length; and
   c) when in such at least one deployed position, said at least one second positional maintainer maintains said at least one first longitudinal axis in a generally perpendicular relationship relative to said at least one second longitudinal axis.

9. The system according to claim 1 wherein said at least one soil-shoveling tool comprises:
   a) at least one shovel blade structured and arranged to assist manipulation of the soil;
   b) wherein said at least one shovel blade comprises at least one first end and at least one second end;
   c) wherein said at least one first end comprises at least one soil-penetrating shape structured and arranged to assist penetration of the soil;
   d) wherein said at least one second end comprises at least one handle-receiving socket structured and arranged to receive said at least one handle-bar.

10. The system according to claim 1 wherein said at least one tool not related to such at least one shoveling activity comprises at least one storage container comprising at least one interior portion structured and arranged to contain storable camping items.

11. The system according to claim 10 wherein said at least one storage container comprises:
    a) at least one deployed position extending generally outwardly of said at least one handle-bar, and b) at least one stowed position located substantially within said at least one internal compartment of said at least one handle-bar;
c) wherein, when in said at least one deployed position, said at least one storage container comprises at least one storage opening structured and arranged to provide access to said at least one interior portion; and
d) wherein, when in said at least one stowed position, said at least one interior portion is substantially enclosed within said at least one handle-bar.

12. The system according to claim 11 wherein:
a) said at least one storage container comprises at least one storage-container pivot structured and arranged to pivotally couple said at least one storage container with said at least one handle-bar; and
b) said at least one storage-container pivot assists pivotal movement of said at least one storage container between such at least one deployed position and such at least one stowed position.

13. The system according to claim 12 wherein said at least one storage container comprises at least one moisture-restrictive seal structured and arranged to limit the introduction of moisture to within said at least one interior portion.

14. The system according to claim 1 wherein said at least one tool not related to such at least one shoveling activity comprises:
a) at least one cutting blade structured and arranged to assist the at least one user to perform cutting actions;
b) wherein said at least one cutting blade is locatable within said at least one handle-bar.

15. The system according to claim 14 wherein said at least one cutting blade comprises:
a) at least one deployed position extending generally outwardly of said at least one handle-bar, and
b) at least one stowed position located substantially within said at least one internal compartment of said at least one handle-bar.

16. The system according to claim 15 wherein:
a) said at least one cutting blade comprises at least one cutting-blade pivot structured and arranged to pivotally couple said at least one cutting blade with said at least one handle-bar; and
b) said at least one cutting-blade pivot assists pivotal movement of said at least one cutting blade between such at least one deployed position and such at least one stowed position.

17. The system according to claim 1 wherein said at least one tool not related to such at least one shoveling activity comprises at least one bottle opener structured and arranged to assist the user in removing bottle caps from beverage bottles.

18. The system according to claim 8 wherein:
a) said at least one support arm comprises at least four support arms each one structured and arranged to support at least one camping item from said at least one handle-bar;
b) wherein at least one of said at least four support arms comprises a length of about thirteen inches; and
c) wherein at least one of said at least four support arms comprises a length of about seven inches.

19. The system according to claim 8 wherein:
a) said at least one soil-shoveling tool comprises
   i) at least one shovel blade structured and arranged to assist manipulation of the soil,
   ii) wherein said at least one shovel blade comprises at least one first end and at least one second end,
   iii) wherein said at least one first end comprises at least one soil-penetrating shape structured and arranged to assist penetration of the soil, and
   iv) wherein said at least one second end comprises at least one handle-receiving socket structured and arranged to receive said at least one handle-bar;
b) said at least one tool not related to such at least one shoveling activity comprises
   i) at least one storage container comprising at least one interior portion structured and arranged to contain storable camping items,
   ii) at least one cutting blade structured and arranged to assist the at least one user to perform cutting actions, and
   iii) at least one bottle opener structured and arranged to assist the user in removing bottle caps from beverage bottles.

20. A method of developing at least one multi-functional shovel to assist at least one user during outdoor camping activities, said method comprising the steps of:
a) providing at least one shovel handle structured and arranged to assist the at least one user in manipulating at least one shovel blade during at least one shoveling activity;
b) providing at least one camp tool, not related to such at least one shoveling activity, usable by the at least one user during such outdoor camping activities and further providing at least one support arm structured and arranged to provide support for the at least one camp tool not related to such at least one shoveling activity, said support arm having a flange extending away from said support arm; and
c) incorporating such at least one camp tool within such at least one shovel handle so that such at least one camp tool is permanently mounted to such at least one shovel handle;
d) wherein such at least one shovel handle comprises at least one internal compartment structured and arranged to internally compartmentalize such at least one camp tool when not in use; and
e) wherein, when internally compartmentalized within such at least one shovel handle, such at least one camp tool does not interfere with hand-manipulation of such at least one shovel handle.

21. The method according to claim 20 further comprising the steps of:
a) providing at least one shovel blade structured and arranged to assist the at least one user to perform such at least one shoveling activity; and
b) mounting such at least one shovel blade to such at least one shovel handle.

22. A system related to assisting at least one user during outdoor camping activities comprising:
a) shovel tool means for assisting the at least one user to accomplish at least one shoveling activity;
b) handle-bar means for assisting the at least one user to manipulate said shovel tool means during the at least one shoveling activity; and
c) tool means not related to such at least one shoveling activity and at least one support arm structured and arranged to provide support for the tool means not related to such at least one shoveling activity, said support arm having a flange extending away from said support arm;
d) wherein said shovel tool means is supported by said handle-bar means;

e) wherein said tool means not related to such at least one shoveling activity is supported by said handle-bar means;

f) wherein said handle-bar means comprises compartment means for substantially fully compartmentalizing said tool means not related to such at least one shoveling activity therewithin.

23. A system related to assisting at least one user during outdoor camping activities, said system comprising:
  a) at least one soil-shoveling tool structured and arranged to assist the at least one user to perform at least one shoveling activity;
  b) at least one handle-bar structured and arranged to assist the at least one user in manipulating said at least one soil-shoveling tool; and
  c) at least one non-shovel tool structured and arranged to provide at least one tool not related to such at least one shoveling activity;
  d) wherein said at least one shovel tool is supported by said at least one handle-bar;
  e) wherein said at least one non-shovel tool is supported by said at least one handle-bar;
  f) wherein said at least one handle-bar comprises at least one internal compartment structured and arranged to internally compartmentalize said at least one non-shovel tool therewithin;
  g) wherein, when internally compartmentalized within said at least one handle-bar, said at least one non-shovel tool does not interfere with hand-manipulation of said at least one handle-bar;
  h) wherein said at least one non-shovel tool comprises at least one storage container comprising at least one interior portion structured and arranged to contain storable camping items; and
  i) wherein said at least one storage container comprises:
  j) at least one deployed position extending generally outwardly of said at least one handle-bar, and
  k) at least one stowed position located substantially within said at least one internal compartment of said at least one handle-bar;
  l) wherein, when in said at least one deployed position, said at least one storage container comprises at least one storage opening structured and arranged to provide access to said at least one interior portion; and
  m) wherein, when in said at least one stowed position, said at least one interior portion is substantially enclosed within said at least one handle-bar.

\* \* \* \* \*